United States Patent Office 3,284,615
Patented Nov. 8, 1966

3,284,615
DIGITAL CONTROL PROCESS AND SYSTEM
Edward W. Yetter, West Chester, Pa., assignor to Burroughs Corporation, Detroit, Mich., a corporation of Michigan
Filed Sept. 24, 1956, Ser. No. 611,519
4 Claims. (Cl. 235—150.1)

The present invention relates to digital control systems, and more particularly to novel and improved methods and apparatus which employ digital computer techniques in the control of steam generating equipment and other suitable industrial equipment, machines, processes and the like.

In the operation of steam generators or boilers as in other industrial continuous processes, various analog controllers have been used heretofore to stabilize operation under varying conditions of load demand. To a large extent the control points of these individual controllers are empirically determined by extrapolation from pilot plant operation or by past experience on the unit in question. The amount of engineering and development which has gone into these systems, particularly in the case of the steam boiler control, has generally resulted in rugged reliable control equipment which gives reasonably good results. In many continuous process control applications, however, such as in control equipment for steam generator propulsion units in naval vessels, where the entire control mode must be capable of rapid change from cruising to battle conditions or the like, the limitations of the analog controller in the flexibility of its control operations and in its capacity for memory storage of data are substantial.

It is therefore a principal object of the present invention to provide a novel and improved control system wherein varied control operations may be effected and wherein an increased capacity for the storage of empirical, experimental, or other suitable information is provided.

It is a further object of the present invention to provide normal and improved digital computer techniques for the control and optimization of the efficiency of a dynamic continuous process.

It is a still further object of the present invention to provide a novel and improved process for the control of a vapor generator wherein the fuel and oxidizer inputs thereto are regulated to maintain a fixed or predetermined output vapor pressure and wherein the fuel oxidizer input ratio is arbitrarily varied to maximize the operating efficiency of the generator.

Other objects and many of the attendant advantages of this invention will be readily appreciated as the same becomes better understood by reference to the following detailed description, which is considered in connection with the accompanying drawings wherein.

Figure 1:
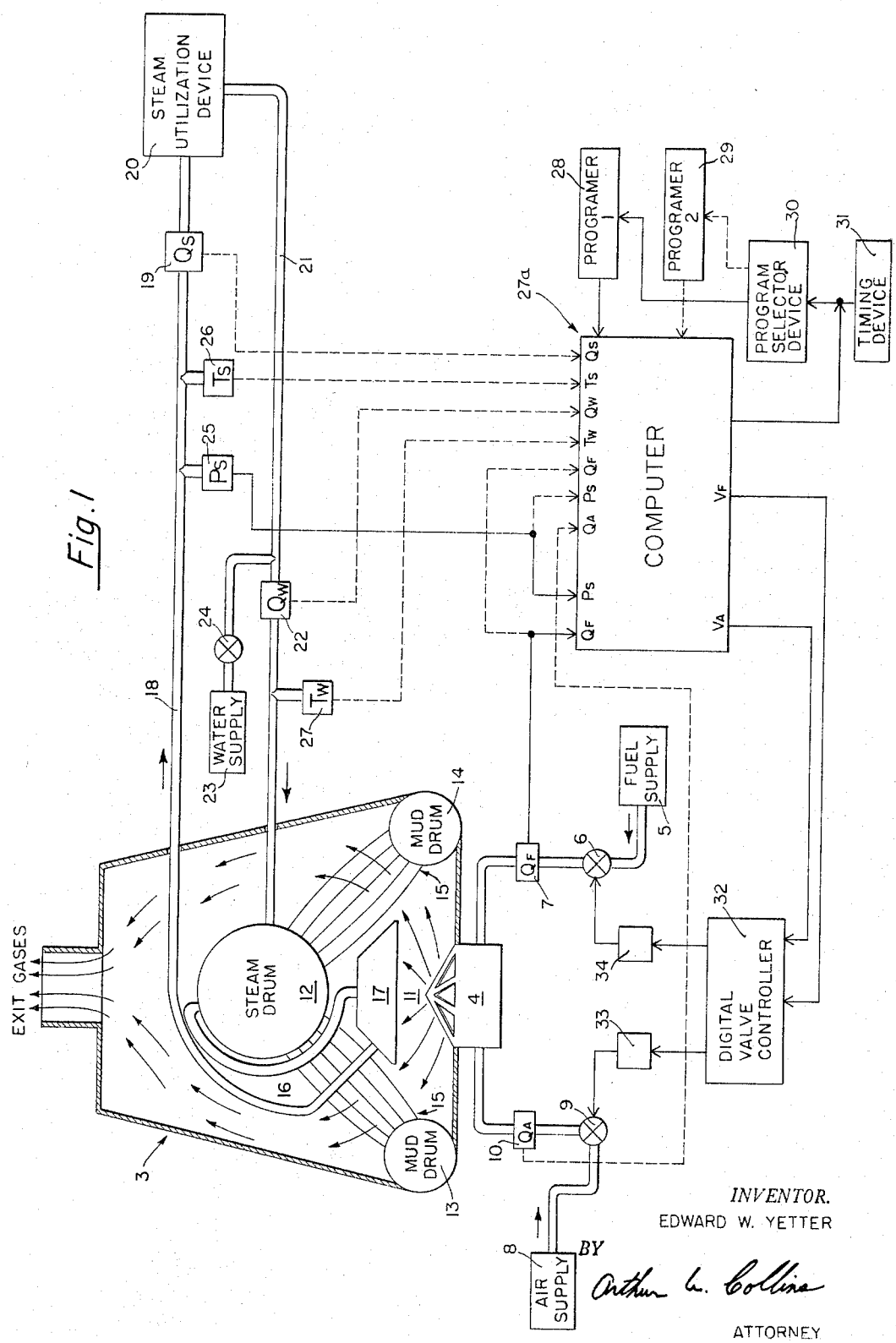
FIGURE 1 is a diagrammatic view of a steam generating unit which is controlled in accordance with a preferred embodiment of the present invention.

Before describing in detail a preferred embodiment of the present invention the general characteristics of steam generator systems and typical control functions used in steam generator control equipment will be considered.

The heat balance of a conventional boiler system, which is simply an expression of the conservation of energy therein, may be written as follows:

$$H_{fc}+H_f+H_a+H_w=H_s+H_L \qquad (1)$$

wherein $H_{fc}$=chemical energy available in the fuel
$H_f$=thermal energy in fuel
$H_a$=thermal energy in air
$H_w$=thermal energy in feedwater
$H_s$=thermal energy in steam output
$H_L$=thermal energy lost in the system The efficiency of such a system is, of course, the useful output energy of the system divided by its energy input or $$E=\frac{H_s}{H_{fc}+H_w+H_f+H_a} \qquad (2)$$

Assuming that the thermal energy in the fuel $H_f$ and the thermal energy in the air $H_a$ are relatively small compared to the chemical energy available in the fuel $H_{fc}$ and the heat energy present in the feedwater $H_w$ which is returned to the generator or boiler from the steam utilization device, this expression of efficiency of the steam generator system may be simplified to $$E=\frac{H_s}{H_{fc}+H_w} \qquad (3)$$

Another method of considering the operating efficiency of a steam generator system is expressed in the equation $$E=1-H_L \qquad (4)$$

Figure 2:
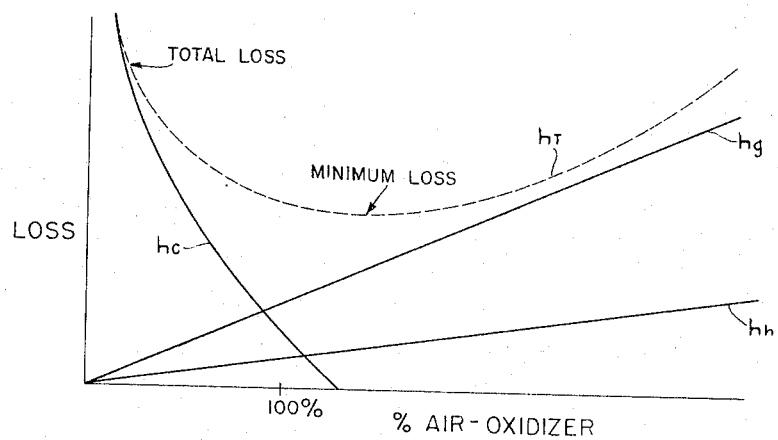
FIGURE 2 is a curve illustrating the relation of the air-oxidizer and losses of the steam generator shown in FIGURE 1.

The losses represented by the term $H_L$ in this expression include radiation losses, losses due to the heating of water formed by the combustion of hydrogen in the fuel, losses resulting from the vaporization and heating of water in the fuel, losses from thermal energy of dry exit flue gases, losses due to the heating of water vapor in the input air, and losses due to incomplete combustion of the fuel. The first three above mentioned losses of the system are determined by design of the steam generator and the quality of the fuel used and must be considered for the purposes of the present invention uncontrollable. The latter three above mentioned losses of the system, however, are, as will be more apparent hereinafter, direct functions of a manipulatable variable and offer opportunity for efficiency optimization. Thus, the above mentioned dry gas loss which consists of simply that heat energy which is lost up the chimney of the generator may be expressed quantitatively by the equation:

$$H_g=W_gC(T_2-T_1) \qquad (5)$$

where $H_g$=dry gas loss
$W_g$=mass flow of exit gas
$C$=specific heat of gas
$T_2$=exit gas temperature
$T_1$=input air temperature This dry gas loss $h_g$ is shown plotted in FIGURE 2 of the drawing as a function of the air input to the system. Inasmuch as the mass flow of exit gas from the steam generator is substantially proportional to the flow of air input thereto, it is seen that the dry gas loss—air input curve of FIGURE 2 is substantially a linear relationship.

The water vapor loss of the system, which is another of the manipulatable variables that offers an opportunity for efficiency optimization, is expressed quantitatively by the equation, $$h_h = W_w(T_2 - {}_1) \qquad (6)$$

where $h_h$ = water vapor loss
$W_w$ = mass flow of water vapor present in the input air As shown in FIGURE 2 of the drawing, this loss is also substantially a linear function of the input air flow of the system.

The other major loss of the system, which is a manipulatable variable for efficiency optimization, is produced by incomplete combustion and is expressed by the equation $$h_c = W_c h_v \qquad (7)$$

where $h_c$ = incomplete combustion process
$W_c$ = mass flow of unburned combustibles in the exit gas
$h_v$ = heating value of these combustibles It is difficult, if not impossible, to express the value of losses from incomplete combustion analytically for any practical system. Theoretically, of course, the stoichiometric value of oxygen and therefore air necessary for complete combustion of the fuel can be computed on the basis that all hydrocarbons are cracked to C and $H_2$, and that the combustion process is $$C + O_2 \rightarrow CO_2 \qquad (8)$$

and $$2H_2 + O_2 \rightarrow 2H_2O \qquad (9)$$

It is also known that due to various imperfections in the combustion process an amount of air in excess of the stoichiometric value for complete combustion is required. Several of the more important of these imperfections are:

(1) The furnace walls are cooler than the flame causing temperature gradients throughout the furnace and less than perfect conditions for complete combustion;

(2) Atomization of fuel is incomplete and contact between fuel and oxygen is imperfect; and (3) The mixing of atomized fuel and oxygen is incomplete.

Thus, as shown in FIGURE 2 of the drawing the incomplete combustion loss curve $h_c$ is a decreasing function of the supply of air furnished to the generator and reaches zero at a value of excess in air between 5% and 30% above the stoichiometric theoretical value.

The shape of the curve of the combined dry gas losses, the water vapor losses, and the incomplete combustion losses of the system $h_t$, which is also shown in FIGURE 2 of the drawing, is generally parabolic and generally reaches a minimum value at a point somewhat above the theoretical stoichiometric air value. Since, as shown by Equation 4 above, the efficiency of the system is effectively the complement of the combined losses, the efficiency—air input curve of the system shown in FIGURE 4 of the drawing is also a parabolic function and reaches an optimum efficiency at an air input value slightly above the theoretical stoichiometric value of combustion. As will be more apparent hereinafter depending upon the point of operation of the system on the parabolic efficiency-air input curve of FIGURE 4, the direction and amplitude of correction of the system fuel and air input values necessary to approach a desired optimum operating point may be determined.

Figure 3:
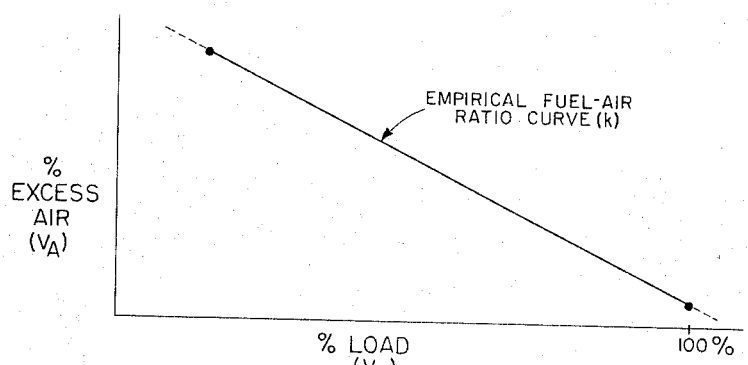
FIGURE 3 is an empirical excess air-load curve used in the control of the generator of FIGURE 1.

Some of the principals underlying servo-control theory and particularly those principals which relate to the control of steam generators will be considered before a preferred embodiment of the present invention is described. The function of the servo system is to determine the existing state of the equipment to be controlled and to furnish control signals in response to measured variables for the control of valve actuators or the like that vary the state of the controlled equipment. The form of the control function used to derive the control signal is dictated by the characteristics of the process or equipment to be controlled. For control of the steam generator equipment in accordance with the present invention the so-called "proportional-plus-reset" control function, in which a quantity's deviation from a control point is combined with the time integral of the deviation to form the final valve actuating signal, is employed. This control function may be expressed symbolically as:

$$V = K_1 D + K_2 \int D \, dt \qquad (10)$$

where $V$ = a valve position
$D$ = the deviation of a measured variable from a control point
$K_1, K_2$ = control constants The normal method of control of the main loop of a steam generator system involves control of the steam output pressure by manipulation of the fuel flow and air flow. This may be accomplished by the parallel method in which the controller manipulates both fuel and air, or by the cascade method in which primary control manipulates fuel which in turn controls air flow. In either case, however, the relationship between fuel flow and air flow is at first generally determined by an arbitrary function, selected preferably experimentally to give good average results. An example of such an experimentally derived function for a steam generating unit is shown in FIGURE 3 of the drawing which is a typical curve of excess air (above the stoichiometric theoretical value) required as a function of load. The general shape of this curve with its decreasing values of excess air for increasing loads is ordinarily caused by design of the system for maximum efficiency at maximum load, greater cooling of the flame at low loads adjacent the furnace walls, and a greater tendency toward stratification and incomplete mixing at low loads. As will be more apparent hereinafter a curve such as that shown in FIGURE 3 is used initially to provide good average results though not necessarily optimum results.

Using the proportional-plus-reset control mode described above, the initial control action of a typical steam generator system may be symbolically expressed by the following equation:

$$V_F = K_2(P_s - P_o) + K_3 \int (P_s - P_o) dt \qquad (11)$$

where $V_F$ = adjusted position of the fuel control valve of the system
$P_s$ = measured output steam pressure
$P_o$ = steam pressure control point
$K_2$ & $K_3$ = characteristic constants of the particular steam generator system As indicated above, once the flow of fuel is adjusted the control of air flow in the system may then be determined by the curve of FIGURE 3 of the drawing wherein the fractional excess air above theoretical decreases linearly with an increase in load and therefore fuel flow to the system. This relationship between the flow of air and flow of fuel to the system is expressed by the equation $$V_A = k V_F \qquad (12)$$

where $V_A$ = adjusted position of the air valve of the system

As will be more apparent hereinafter, from Equations 11 and 12, the preliminary disposition of the air and fuel values of the system may be adjusted and controlled to maintain a substantially constant output pressure in spite of variations in the load requirements of the system. Thereafter, the fuel-air input ratio of the system is readjusted for efficiency optimization in a particularly unique feature of the present invention in a manner which will also be described in detail hereinafter.

A preferred embodiment of the present invention wherein digital computer techniques are used to operate upon the above described control functions is illustrated in FIGURE 1 of the drawing. As shown therein, the steam generator or boiler 3 is fired by the burner 4 which receives fuel under pressure from the fuel supply source 5 through the control valve 6 and the flowmeter 7. Air is delivered under pressure to the burner from the air supply 8 source through the control valve 9 and its flowmeter 10. Within the boiler 3 there is shown the combustion chamber 11, the steam drum 12, the mud drums 13 and 14, and the water tubes 15 which interconnect the mud drums with the steam drum. Dry pipe 16 conducts the saturated steam from the steam drum 12 through the superheating coils 17 of the boiler to the steam output line 18. Output steam from the boiler 3 is conducted through the steam output line 18 and the flowmeter 19 to the steam utilization device 20 and is then returned to the steam drum 12 through the feedwater line 21 and the flowmeter 22. The feedwater returned to the boiler may be increased and/or replenished from the water supply source 23 by suitable control of valve 24. Boiler output pressure and temperature devices 25 and 26 and the feedwater temperature device 27, which may be of conventional design, are coupled to the steam output line 18 and the feedwater boiler return line 21 and together with the flowmeter devices 7, 10, 19 and 22 continuously provide suitable input data for the computer 27a in a manner which will be more apparent hereinafter.

The computer 27a together with the program devices 28 and 29 are of conventional design and by themselves form no part of the present invention. Therefore, for the sake of simplicity a full description of the same is not provided herein. For a full understanding of the present invention it need only be understood that when the proper data from the flowmeters 7, 10, 19 and 22, the temperature sensitive devices 26 and 27 and the pressure sensitive device 25 are fed into the computer, programmers 28 and 29 regulate its operation such that suitable electrical signals or the like are provided on the computer output circuit indicating results of the solution of the boiler control functions or Equations 3, 11 and 12 described above. Selection of either programmer 28 or programmer 29 for control of computer 27a is determined by the magnitude of the difference between the control output pressure $P_o$ and the actual output pressure $P_s$ and its differential with respect to time. Such selective control of two or more preset program operations in response to the amplitude of predetermined variables is conventional in the computer art. For further details of the manner in which a digital general purpose computer is programmed and performs the computations required for basic control and optimization of an operation such as that of the boiler disclosed herein, reference may be had to the following publications:

(a) "You Can Program the Burroughs E–101," Form #EDP 104, published by the Burroughs Corporation of Detroit, Michigan, 1955 copyright.

(b) U.S. patent application by Hoberg et al., Serial No. 492,062, filed March 4, 1955, now Patent No. 3,053,-449 and titled "Electronic Computer System."

Output circuits of the computer 27a, over which control signals $V_A$ and $V_F$ are conducted, are preferably electrically coupled as shown to the digital valve controller 32 and the electro pneumatic converter devices 33 and 34 which may be of any suitable conventional design for adjustment and control of the fuel and air valves 6 and 9. Details of the valve controller 32 which per se also form no part of the present invention are described and claimed in a copending application by E. W. Yetter, Serial No. 607,671 filed September 4, 1956, titled "Digital Valve Control System," now Patent No. 3,114,102 and assigned to the same assignee as is this application.

In the operation of the above described apparatus variations in the load requirements of the steam utilization device 20 produce inverse variations of the pressure $P_s$ in the steam output line 18. As long as these variations of load demand of the system cause the actual pressure $P_s$ in the steam output line 18 as measured by the pressure sensitive device 25 to differ from a predetermined boiler control pressure $P_o$ a predetermined amount; i.e., as long as $$P_s - P_o > K_4 \quad (13)$$

or as long as the differential of $P_s - P_o$ with respect to time exceed a predetermined value, the program selector device 30 operatively connects programmer 28 to the computer.

With programmer 28 energized and operatively connected to the computer 27a data $Q_F$ from the fuel flowmeter 7 and data $P_s$ from the steam line pressure sensitive device 25 are used in the computer to operate upon the above discussed control function:

$$V_F = K_2(P_s - P_o) + K_3 \int (P_s - P_o) dt \quad (11)$$

to provide a fuel valve control signal $V_F$ which will quickly produce adjustment of the fuel control valve 6 through the valve controller 32 and the converter device 34. In this way the output steam pressure $P_s$ of the boiler tends to maintain a value equal to the control pressure $P_o$ of the system.

At the same time that adjustments of the position of the fuel valve 6 are made with variations of load requirements of the system, data $Q_F$ from the fuel flowmeter 7 is being used in the computer to determine the disposition of the air control valve 9 in accordance with the above discussed control function.

$$V_A = kV_F \quad (12)$$

The desired constant $k$ of this control function varies with the load requirement of the system and is preferably determined by interpolating between points of a curve similar to that shown in FIGURE 3 of the drawing stored in a conventional manner in the memory device of the computer. Thus, as long as the programmer 28 is operatively connected to the computer the control function of Equation 11 above is used to adjust and control the position of the fuel valve 6 and the input air-fuel ratio of the system is determined by control points of an excess air-load curve stored in the memory device of the computer.

Figure 4:
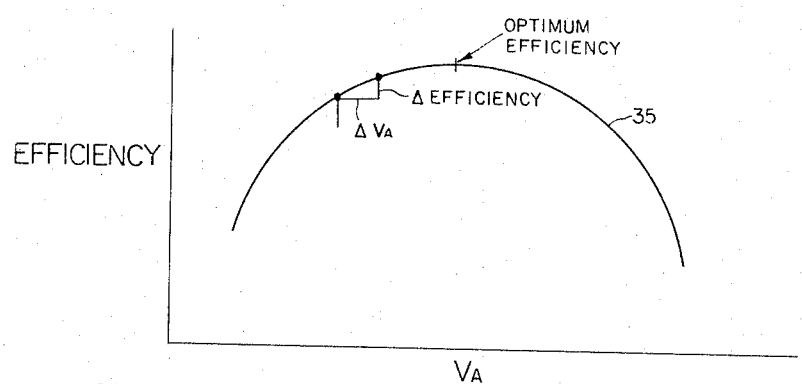
FIGURE 4 is an efficiency air input curve of the generator shown in FIGURE 1.

When reduced load variations of the system allow the actual pressure $P_s$ in the steam output line 18 to more nearly approach the desired control pressure $P_o$ of the system such that $$P_s - P_o < K_4 \quad (14)$$

and the differential of $P_s - P_o$ becomes smaller than a predetermined value, the program selector device 30 deenergizes programmer 28 and operatively connects programmer 29 to the computer. Using the computer input data $P_s$, $T_s$, $Q_s$, $Q_f$, $T_w$, and $Q_w$ which is respectively obtained from the steam pressure sensitive device 25, the steam temperature sensitive device 26, the steam flowmeter 19, the fuel flowmeter 7, the feedwater temperature sensitive device 27, and the feedwater flowmeter 22, the programmer 29 is then used with the computer to determine the direction or sign of the correction which is required to optimize operation of the boiler by proper adjustment of the input fuel-air ratio to the system. More specifically, the data obtained on computer input lines which are dotted in FIGURE 1 of the drawing are used in the computer to determine the operating efficiency of the boiler by means of the above discussed equation $$\text{Efficiency} = \frac{\text{Energy out}}{\text{Energy in}} = \frac{H_{sl} \times Q_s}{H_{fel} \times Q_F + H_{wl} \times Q_w} \quad (3)$$

where $H_{sl}$ = thermal energy in steam per unit of flow
$H_{fc}$ = chemical energy in fuel per unit of flow
$H_w$ = thermal energy in feedwater per unit of flow Measure of the flow of steam, fuel and water $Q_s$, $Q_F$ and $Q_w$ for solution of Equation 3 in the computer is obtained from flowmeters 19, 7 and 22. Measure of the heat content of the steam output $H_s$ is obtained from conventional Mollier table values stored in the memory device of the computer by sensing data from the pressure device 25 and the temperature device 26. Measure of the heat content $H_w$ of the feedwater which is returned to the boiler from the steam utilization device 20 for application in the computer in the solution of Equation 3 is obtained from a feedwater heat content temperature table of values stored in the computer memory, and the measure of the heat content of the fuel $H_f$ is obtained by preselection of a constant which represents heat value of a particular grade of fuel delivered to the boiler. With this data input Equation 3 is solved in the computer in a conventional way and the operating efficiency of the system is obtained. The air valve control signal $V_A$ which determines the disposition of the air control valve 9 is then varied a small arbitrary amount from the value determined by Equation 12 discussed above. With the resulting change of air delivered to the boiler and the change in the fuel air input ratio of the system the operating efficiency of the system is then redetermined by solution of Equation 3 in the computer. The direction of correction required to approach optimum system operation from the operating position of the system on curve 35 of FIGURE 4 of the drawing is then determined from the slope of the curve 35 at that point. This slope is obtained from the ratio of the computed change in efficiency to the arbitrary change in air input to the system which caused the efficiency change. Thus, the direction of correction required for optimization is obtained from the sign in the equation $$S = \frac{\Delta \text{Efficiency}}{\Delta V_A}$$

where $S$ = slope of curve 35 in FIGURE 4

The magnitude of the correction toward the optimum point is determined by the magnitude of the difference in the efficiencies of the two efficiency computations in computer 27a described above, and the computer output signal $V_A$ operates through the valve controller 32 and the valve actuator 33 to readjust the position of air valve 9 for optimum generator operation.

This optimizing operation is repeated again and again until the change in efficiency produced by the previous adjustment in the supply of input air becomes less than a predetermined amount. When this occurs, this new optimum value of input air for a given system load requirement is stored in the memory of the computer to replace a point originally on the curve of FIGURE 3. Thus, the curve of FIGURE 3, which is defined by a plurality of points, one point within each of a plurality of predetermined load increments, tends generally to reflect more accurately an optimized oxidizer-load and therefore oxidizer-fuel ratio of the system during the preliminary fuel-oxidizer control adjustment discussed above.

When no substantial change of load in the steam utilization device occurs within a predetermined time interval to readjust the dispositions of fuel and air control valves as described above, the timing device 31 energizes the program selector device 30 such that programmer 29 is again operatively connected to the computer. Thus, another arbitrary change in the air input to the system is produced and the optimizing operation described is repeated to check and recheck the positions of valves 6 and 9 for optimum efficient operation of the system.

Obviously many modifications and variations of the present invention are possible in the light of the above teachings. It is therefore to be understood that within the scope of the appended claims the invention may be practiced otherwise than as specially described.

What is claimed is:

1. A method of adjusting the fuel and oxidizer input to a steam generator to achieve maximum efficiency, said method comprising the steps of
    (a) measuring the difference between the steam output pressure of said generator and a predetermined control pressure,
    (b) adjusting the input of fuel to said generator in the amount and direction which reduces the measured difference to substantially zero,
    (c) measuring the rate of said input of fuel,
    (d) generating an oxidizer signal having a magnitude proportional to the minimum rate of flow of oxidizer required to completely oxidize said fuel at the rate of said input of fuel,
    (e) controlling the rate of introduction of oxidizer into said steam generator in accordance with the value of said oxidizer signal,
    (f) generating and storing a first efficiency signal proportional to the efficiency with which said steam generator converts input energy into load energy at the existing rate of input of fuel and oxidizer,
    (g) changing the ratio of the rate of input of fuel to the rate of input of oxidizer by an arbitrary amount,
    (h) generating and storing a second efficiency signal proportional to the efficiency at the arbitrarily changed rate of input of fuel and oxidizer,
    (i) comparing said first and second efficiency signals to determine the difference in their magnitude, and
    (j) adjusting the ratio of the rate of input of fuel to the rate of input of oxidizer in an amount and a direction which are functions of said determined difference in magnitude.

2. A method of adjusting the operation of a continuous process system dependent on input energy in the form of fuel for its operation, said method comprising the steps of
    (a) measuring the difference between an output parameter of the system and a predetermined desired output parameter,
    (b) adjusting the input of fuel to the system in the amount and direction which reduces the measured difference to substantially zero,
    (c) measuring the rate of said input of fuel,
    (d) generating an oxidizer signal having a magnitude proportional to the minimum rate of flow of oxidizer required to completely oxidize said fuel at the rate of said input of fuel,
    (e) controlling the rate of introduction of oxidizer into the system in accordance with the value of said oxidizer signal,
    (f) generating and storing a first efficiency signal proportional to the efficiency with which the system converts input energy into load energy at the existing rate of input of fuel and oxidizer,
    (g) changing the ratio of the rate of input of fuel to the rate of input of oxidizer by an arbitrary amount,
    (h) generating and storing a second efficiency signal proportional to the efficency at the arbitrarily changed rate of input of fuel and oxidizer,
    (i) comparing said first and second efficiency signals to determine the difference in their magnitude, and
    (j) adjusting the ratio of the rate of input of fuel to the rate of input of oxidizer in an amount and a direction which are functions of said determined difference in magnitude.

3. A method of optimizing the operation of a continuous process system dependent on input energy in the form of fuel for its operation, said method comprising the steps of (a) measuring the difference between the output of the system and a predetermined desired output,
(b) adjusting the input of fuel to said system in the direction for reducing the measured difference to substantially zero,
(c) introducing an oxidizer into the system at substantially the minimum rate of flow of oxidizer required to completely oxidize the fuel at the rate of said input of fuel,
(d) generating and storing a first efficiency signal proportional to the efficiency with which said system converts input energy into load energy at the existing rate of input of fuel and oxidizer,
(e) arbitrarily changing the ratio of the rate of input of fuel to the rate of input of oxidizer by an incremental amount,
(f) generating and storing a second efficiency signal proportional to the efficiency at the arbitrarily changed rate of input of fuel and oxidizer,
(g) comparing said first and second efficiency signals to determine the difference in their magnitude, and
(h) adjusting the ratio of the rate of input of fuel to the rate of input of oxidizer in an amount and a direction which are functions of said determined difference in magnitude.

4. A method of optimalizing the operation of a continuous process system dependent on input energy for its operation, said method comprising the steps of
(a) measuring the difference between the output of the system and a predetermined desired output,
(b) adjusting the input energy of the system in the direction for reducing the measured difference to substantially zero,
(c) introducing the input energy into the system and measuring said energy as it is introduced,
(d) generating and physically storing a first efficiency signal having a physical parameter uniquely characteristic, in a predetermined manner, of the magnitude of the efficiency with which said system converts input energy into load energy at said adjusted rate of input energy,
(e) arbitrarily changing the rate of input energy by an incremental amount,
(f) generating and physically storing a second efficiency signal having a physical parameter uniquely characteristic, in a predetermined manner, of the magnitude of the efficiency at the arbitrarily changed rate of input energy,
(g) comparing said first and second efficiency signals to determine the difference in their magnitude, and
(h) adjusting the input energy in an amount and a direction which are functions of said determined difference in magnitude.

References Cited by the Examiner
UNITED STATES PATENTS
2,753,503   7/1956   Wideroe _____ 235—150.1

MALCOLM A. MORRISON, *Primary Examiner.*
K. W. DOBYNS, *Assistant Examiner.*